Jan. 16, 1962 B. G. FREUND 3,016,627
APPARATUS FOR DEHYDRATING FOOD AND THE LIKE
Filed April 22, 1959 2 Sheets-Sheet 1
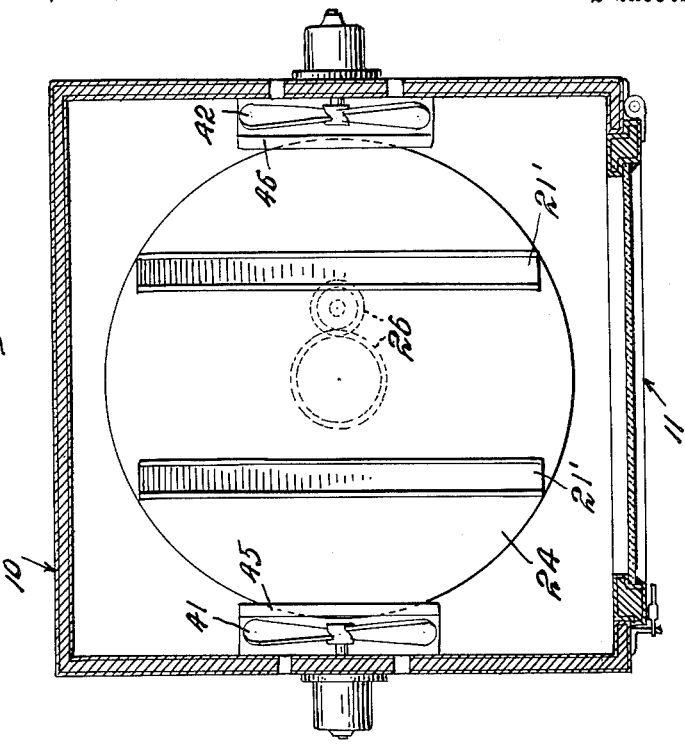
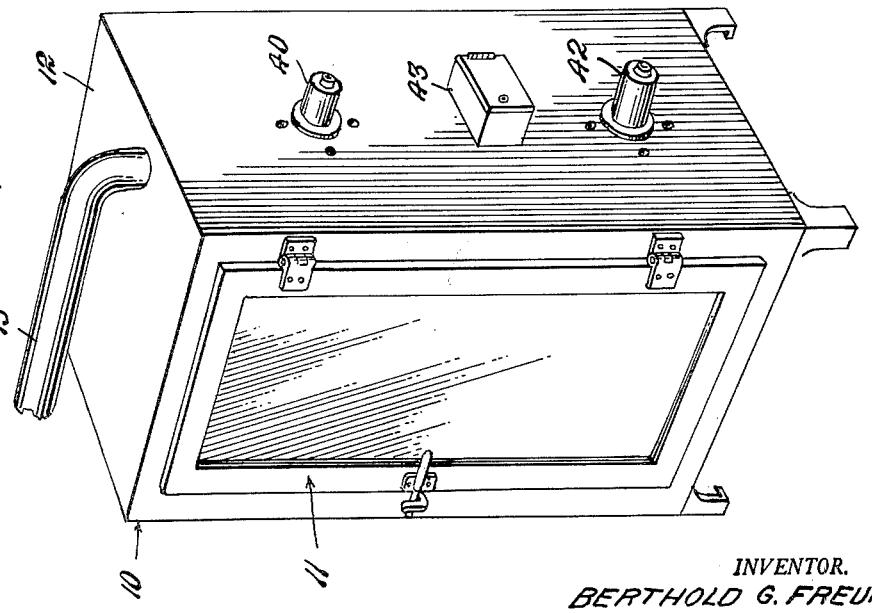
INVENTOR.
BERTHOLD G. FREUND
BY
ATTORNEY

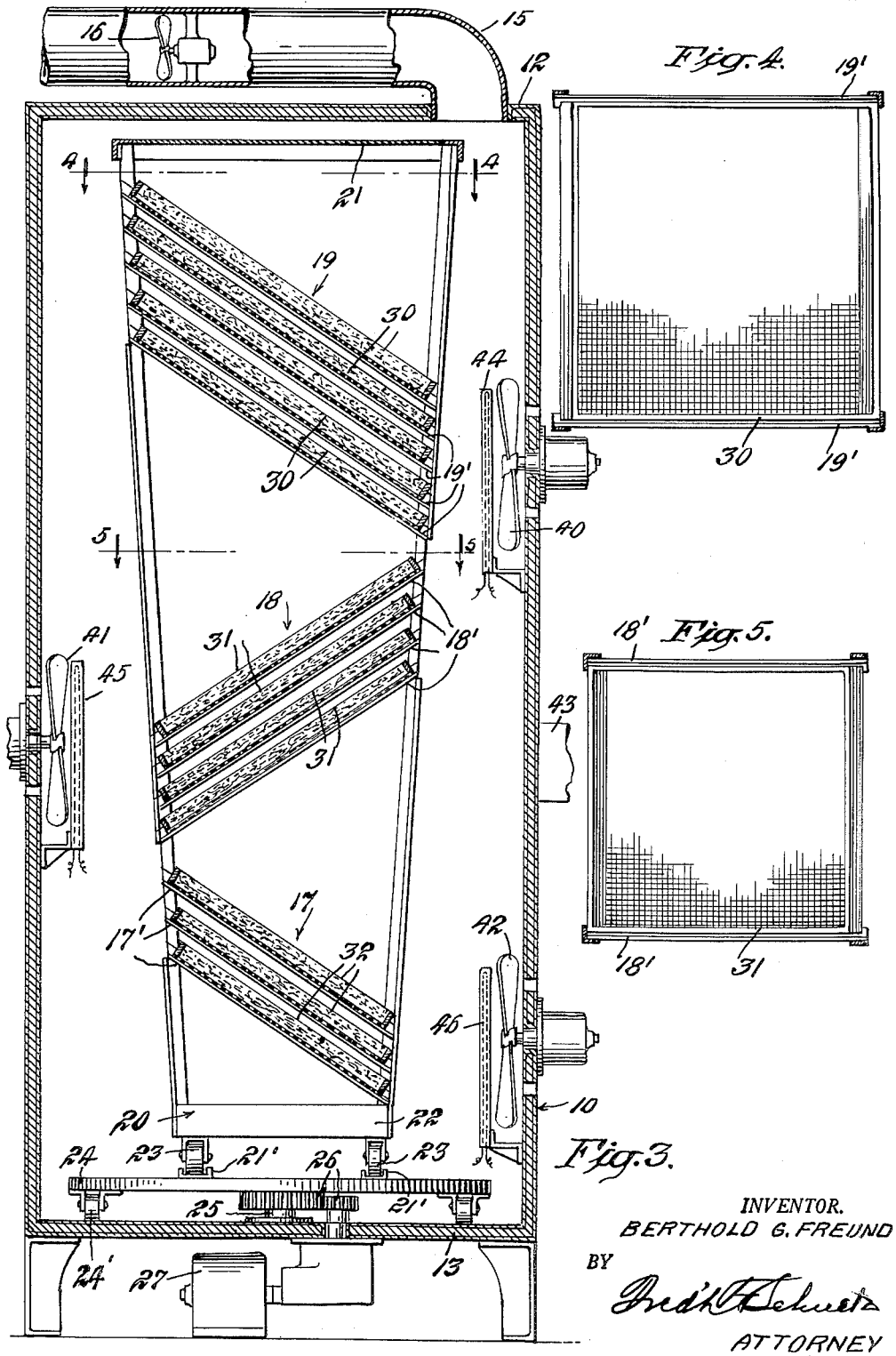

United States Patent Office 3,016,627
Patented Jan. 16, 1962

3,016,627
APPARATUS FOR DEHYDRATING FOOD
AND THE LIKE
Berthold G. Freund, 105—35 67th Road,
Forest Hills, N.Y.
Filed Apr. 22, 1959, Ser. No. 808,058
5 Claims. (Cl. 34—187)

The invention relates to dehydrating apparatus utilized, more particularly, in the dehydration of vegetables, fruits etc., as well as, generally, of material of a cellular structure—the dehydration to be accomplished without impairment of said cellular structure.

In a prior U.S. Letters Patent #2,329,600 granted to me, there is disclosed an apparatus of the general type for effective dehydration of such materials. However, certain objections were found to the arrangement therein set forth; and it is an object of the instant application not only to overcome these objections, but to provide a much more effectively-operating apparatus and one of a more simple construction.

Another object of the invention is to provide a drying compartment adapted to receive a plurality of batches of the material for dehydration therein, the dehydration being accomplished in such a manner that the various batches may be simultaneously and generally uniformly dehydrated.

To this end, a multiple batch-drying arrangement and novel rotational-dehydrating medium application is involved; and whereby not only are greater efficiency and simplicity of operaiton attained, but a more desirable product is secured.

The nature of the invention, however, will best be understood when described in connection with the accompanying drawings, in which:

FIG. 1 is an isometric view of the novel dehydrating cabinet, the same being provided with door for introduction of the material to be dehydrated.

FIG. 2 is a horizontal section taken just below the top of the cabinet, and with the truck and material carried thereby for dehydration in the cabinet removed.

FIG. 3 is a vertical, transverse section, on an enlarged scale, through the cabinet containing truck supported trays for material to be dehydrated.

FIGS. 4 and 5 are horizontal sections, taken respectively on the lines 4—4 and 5—5, illustrating suitable trays for retaining the material to be dehydrated.

Referring to the drawings, more particularly FIGS. 1 and 2, 10 designates a suitably shaped, normally closed and thermally insulated housing or container within which the dehydration is to be conducted, said housing being designed to open fully at the front to provide entrance of material to be dehydrated. It is adapted, as by means of a glass-paneled door 11, to close substantially the said housing when the dehydration process is being conducted, as well as to admit of the introduction and removal of the charge. A top 12 and bottom 13 are also provided, the former being equipped with an exit duct 15 including an exhaust fan 16 for the spent dehydrating medium—generally heated air. The bottom 13 is designed to support the charge, as is hereinafter set forth.

In accordance with the invention, such charge, before being subjected to dehydration, is divided into a plurality of individual batches, for example, the batches 17, 18 and 19 which are conducted to the dehydrating housing 10 by suitable transportation means such as a truck 20. The latter is of the open-type, angle-iron construction affording oppositely disposed side ledges 17', 18' and 19'—opposite sides of the truck remaining open—for support of the different batches, as the three illustrated. Thus, it comprises an open-work framing of an inverted and truncated pyramidal shape, as shown; and it is closed at the top by a cap 21 and at the bottom by a plate 22.

The said bottom, furthermore, is provided with rollers 23 for conveniently manipulating said truck and positioning and fixing it upon a pair of channel members 21 secured to the upper surface of a platform 24 bearing rollers 24'.

Said truck thus is designed for rotation about a vertical axis when so located within the container 10 upon said platform.

To this end, the platform 24 is caused to be rotated about the vertical axis of the container and positioned truck, said platform having an integral spindle 25 which is rotated through intermediate gearing 25 from a motor 27 attached to the underside of the bottom of container 19.

A desired, and necessary, rotation may thus be conveniently imparted to said truck when installed within said housing upon the platform 24. Such rotation is essential in the carrying out of the invention to secure uniform dehydration—under the application of relatively high temperatures of the gaseous medium applied—of the respective batches of the cellular type material which attains a temperature of from 90° F. to 95° F. without distruction of its cellular structure.

In this connection, while the material to be dehydrated is introduced in superposed sets of trays 30, 31 and 32 with open screen bottom, such sets are inclined vertically not only to overcome the effect of centrifugal force on a batch, but to effect, as well, a uniform drying action thereon. To this end, alternate racks bearing trays are inclined oppositely in a vertical plane and at an angle of approximately 35 degrees. That is to say, they are so inclined that, as the truck rotates, a group of superposed batches will, each, be subjected uniformly substantially over its entire bulk to the applied gaseous drying medium such, for example, as respective streams of heated air. To this end, there is associated with the respective banks and as is indicated in FIG. 2, corresponding motor-driven fans 40, 41 and 42, the same being supported, preferably, on the inner face of the wall of the housing, as shown; and power therefor is introduced through the external control box 43.

There is provided, also, in front of each fan similarly mounted heat producing units 44, 45 and 46 respectively, for example, of the electrical resistance type or an electric lamp (not shown). These heating units and associated fans are staggered vertically, as shown, with respect to said batches, and are of a height substantially equal to the height of a rack. It is to be noted that, as the truck rotates such banks of trays past their associated heating means, there results an apparent sweep of the heated streams across a bank at the plane of transition which thus insures substantially uniform distribution of the dehydrating medium and uniform dehydration of the material carried by the trays.

Moreover, in accordance with the truncated construction of the truck frame, the effective supporting areas of the trays supported thereon will increase greatly toward the top of the truck—approximately 50%—the quantity or batch of material to be dried, however, being substantially the same in each group of trays. The heating arrangement is such, also, that the heat-producing units 44, 45 and 46 are operated—progressing upwardly —at a progressively reduced temperature. For example, the lowermost unit 46 will provide for a temperature of 120° F., the intermediate unit 45 for a temperature of 110° F., and the uppermost unit 46 for a temperature of 100° F. An excess of air at room temperature is introduced at the bottom of the container by fan 42; and the spent gases are withdrawn from its top portion for discharge to the atmosphere, through duct 15, under the action of its fan 16.

By thus exposing the rotating batches of material to the action of individual streams of the dehydrating medium at temperatures ranging from 100° F. to 120° F., all but 3% to 5% of water may be removed—the natural color, aroma, vitamin content and other food values being conserved. Moreover, there is no impairment of the cellular structure of the material dehydrated and its appearance is preserved.

I claim:

1. Dehydrating apparatus, comprising: a normally closed, thermally-insulated housing affording a treating chamber, the top thereof being provided with an outlet for spent gaseous dehydrating medium; a door associated with said housing to afford an opening for introduction of material for dehydration; a rotatably-supported platform at the bottom of the housing, and means to rotate the platform; an inverted, truncated pyramidal, openframe truck adapted for removable support by said platform coaxially within the housing and passable through the opening afforded by the said door; a plurality of vertically inclined banks of open, perforated-bottom trays removably supported by the truck and adapted for introduction of material to be dehydrated within the housing, alternate banks being oppositely inclined; and means, supported by and located within said housing, for juxtaposition each to the lower end of a corresponding bank of racks, when located therein, to direct through material on said trays corresponding streams of heated gaseous, dehydrating medium.

2. Dehydrating apparatus according to claim 1, wherein fans are provided to direct said gaseous medium over the trays; and heat-producing means are associated individually with the respective fans between the same and the corresponding lower ends of the tray banks.

3. Dehydrating apparatus according to claim 2, wherein the temperature of the dehydrating gaseous medium directed to the lowermost bank of trays is the maximum, and the temperatures of the directed medium applied to successive batches progressively decreases.

4. Dehydrating apparatus according to claim 1, wherein the banks of trays comprise an unlike number of trays.

5. Dehydrating apparatus according to claim 1, wherein the effective superficial area of the respective banks of trays increases gradually from the bottom to the top of the truck.

References Cited in the file of this patent

UNITED STATES PATENTS

| | | |
|---|---|---|
| 300,118 | Parker | June 10, 1884 |
| 1,552,210 | Bussler | Sept. 1, 1925 |
| 1,927,396 | Freund et al. | Sept. 19, 1933 |
| 2,329,600 | Freund | Sept. 14, 1943 |